United States Patent
Johnson

(10) Patent No.: US 8,031,382 B2
(45) Date of Patent: Oct. 4, 2011

(54) DISPLAYING AN IMAGE

(75) Inventor: Terence Edward Johnson, Aylesford (GB)

(73) Assignee: BAE Systems plc, London (GB)

( * ) Notice: Subject to any disclaimer, the term of this patent is extended or adjusted under 35 U.S.C. 154(b) by 301 days.

(21) Appl. No.: 12/299,578

(22) PCT Filed: Sep. 16, 2008

(86) PCT No.: PCT/GB2008/050827
§ 371 (c)(1),
(2), (4) Date: Nov. 4, 2008

(87) PCT Pub. No.: WO2009/040570
PCT Pub. Date: Apr. 2, 2009

(65) Prior Publication Data
US 2010/0172001 A1    Jul. 8, 2010

(30) Foreign Application Priority Data

Sep. 26, 2007 (EP) .................................... 07270056
Sep. 26, 2007 (GB) .................................. 0718785.9

(51) Int. Cl.
*G03H 1/08* (2006.01)
*G03H 1/04* (2006.01)

(52) U.S. Cl. .................................. 359/9; 359/35; 359/32

(58) Field of Classification Search ................ 359/9, 25, 359/32, 33, 35
See application file for complete search history.

(56) References Cited

U.S. PATENT DOCUMENTS 5,016,953 A * 5/1991 Moss et al. ........................ 359/9
2007/0024999 A1 2/2007 Crossland et al.

FOREIGN PATENT DOCUMENTS

| GB | 2 445 958 A | 7/2008 |
|----|----|----|
| WO | WO 2005/059660 A2 | 6/2005 |
| WO | WO 2005/059881 A2 | 6/2005 |
| WO | WO 2005059881 A2 * | 6/2005 |
| WO | WO 2006/134398 A2 | 12/2006 |

OTHER PUBLICATIONS

International Preliminary Report on Patentability and Written Opinion dated Mar. 30, 2010.
Amako, J., et al., "Speckle-noise reduction on kinoform reconstruction using a phase-only spatial light modulator", Applied Optics, Jun. 10, 1995, pp. 3165-3171, vol. 34, No. 17.
Ambs, P., et al. "Dynamic Diffractive Optical Elements displayed on Spatial Light Modulators", Proceedings of SPIE, 2004, pp. 293-303, vol. 5477.

* cited by examiner

*Primary Examiner* — Audrey Y Chang
(74) *Attorney, Agent, or Firm* — Scully, Scott, Murphy & Presser, PC

(57) ABSTRACT

A target image 60 is multiplied by an appropriate phase pattern to provide a phase modified image 61 to which an inverse Fourier transform is applied to generate a source hologram 62. A set of intermediate holograms 63 are generated from the source hologram 62 using vertical and/or horizontal shifts of the source hologram 62. A set of final holograms 64 are generated from the set of intermediate holograms 63 using sum and/or differencing of various members of the set of intermediate holograms 63. Each final holograms 64 is approximated to form kinoforms 65 for sequential display to an observer 66 as illuminated subframes 67a to 67d. The observer 66 perceives only one image formed from a number of subframes 67a to 67d, wherein the noise associated with the kinoforms 65 averages over time and the observer 66 perceives an attenuation of such noise.

12 Claims, 4 Drawing Sheets

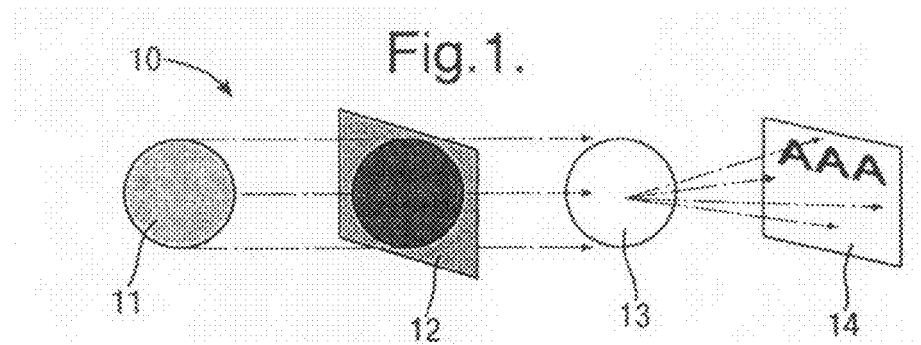
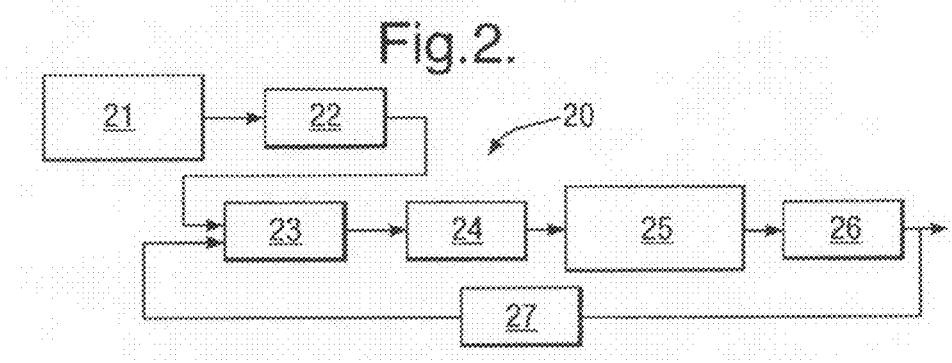
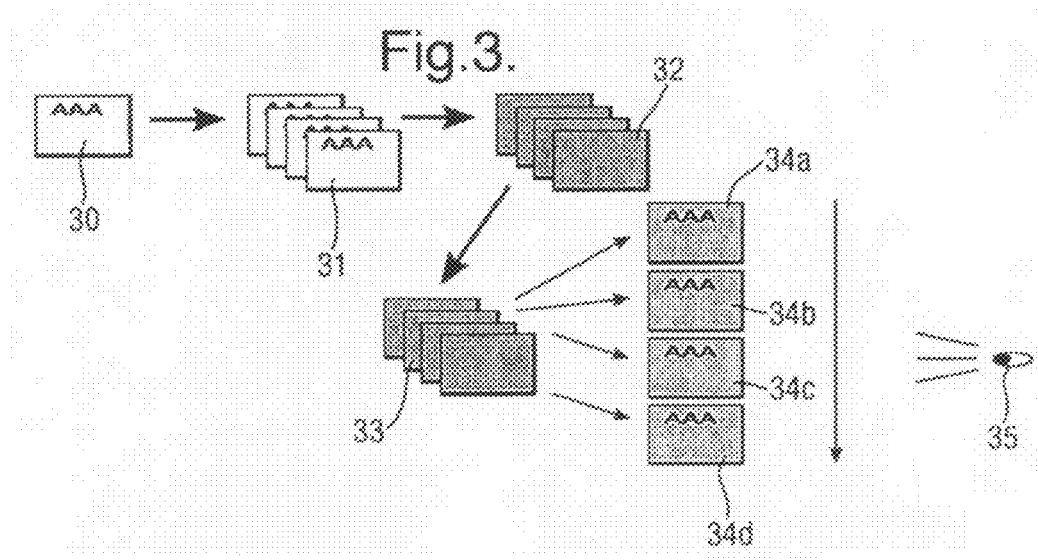

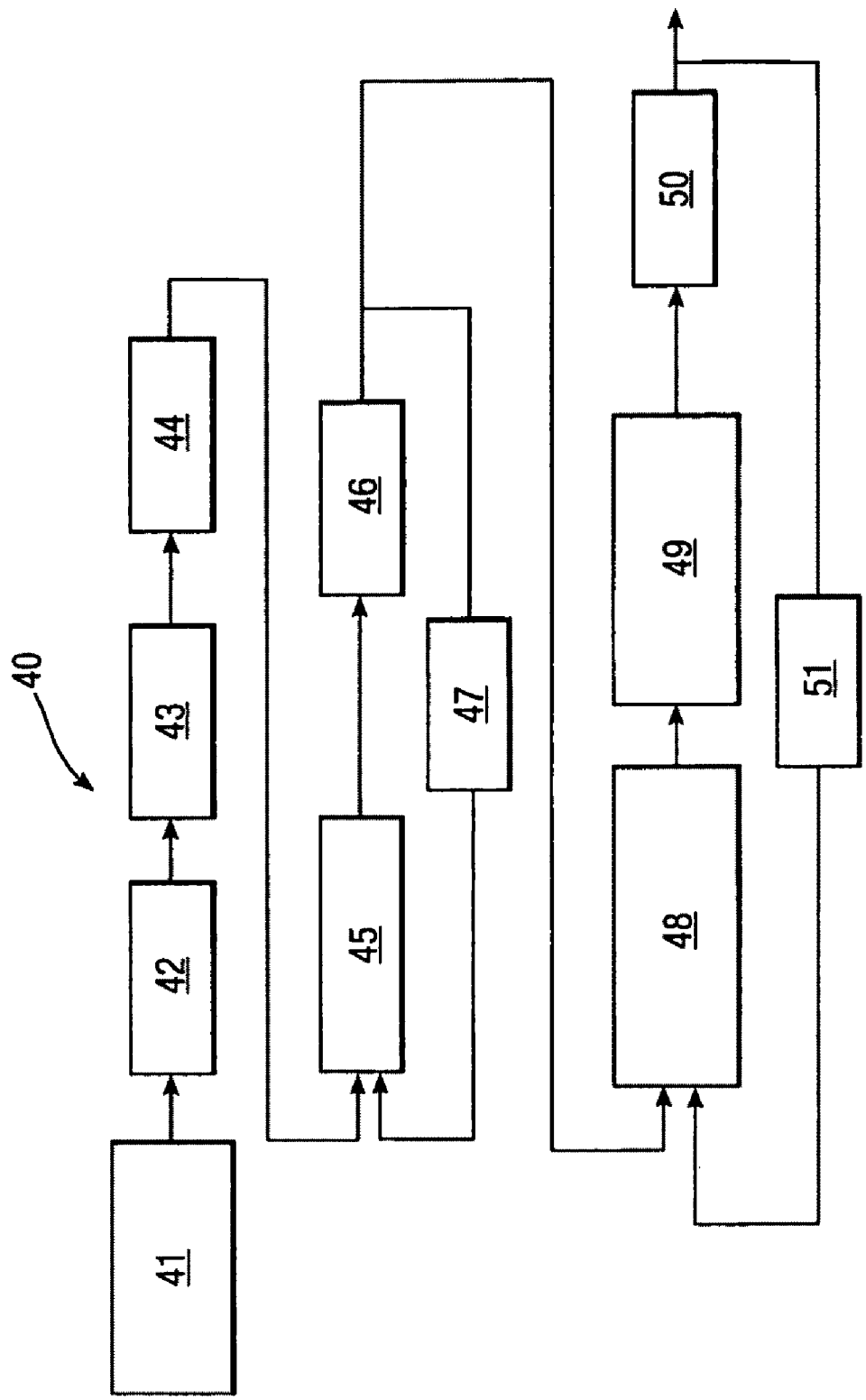

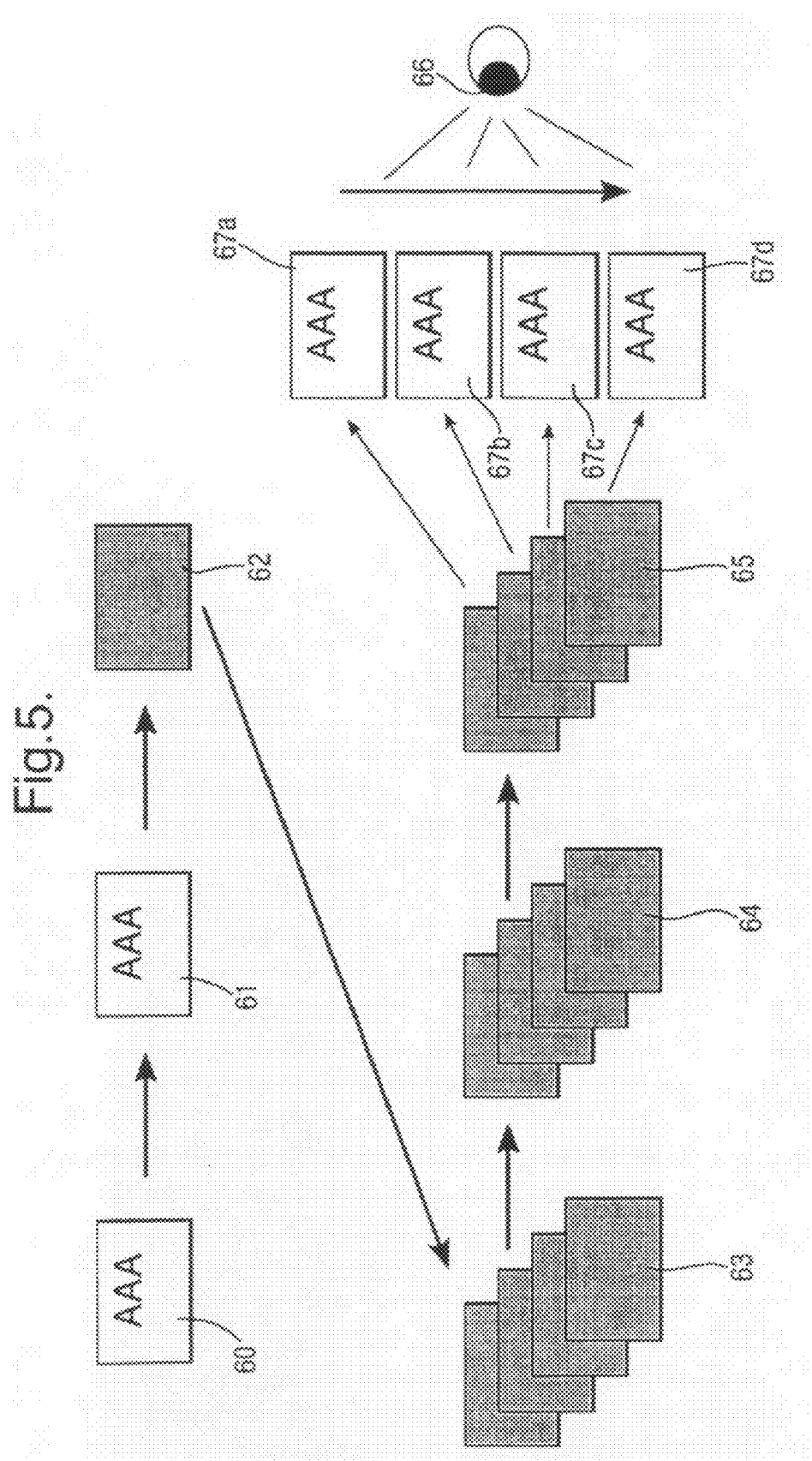

DISPLAYING AN IMAGE

This invention relates to a method for generating an image and an apparatus for displaying an image, which is particularly, but not exclusively, suitable for use in a head-up display or helmet mounted display.

A Fourier generator is a device for the generation of holographic displays. This is a new technical field for which WO 2005/059881 and WO 2005/059660, both in the name of Cambridge University Technical Services Limited, describe such a Fourier generator. WO 2005/059881 describes a method of displaying a video image which comprises receiving sequential image frames at a processor and processing each image frame to obtain a form of hologram known as a kinoform. A programmable diffractive element such as a spatial light modulator, represents the sequence of kinoforms allowing reproduction of a desired image using a suitable illumination source. WO 2005/059660 discloses a method of displaying a holographically generated video image having plural video frames. For each period there is provided a respective sequential plurality of holograms. The holograms of the plural video frames are displayed for viewing in a replay field and the noise variation within each frame is perceived by an observer to be attenuated as the noise averages across the plurality of holograms.

Accordingly, the first of these patent applications relates to a real time display of a video image by means of sequential configurable computer generated holograms. Various means are proposed for the computation of the hologram content, the real time manifestation of the holograms and the optical projection of the holograms. The principal means to describe the dynamic creation of the hologram is to program a diffractive device for phase only modulation of the programmable elements. The principal means for determining the hologram content is to compute a multiplicity of phase holograms for display during each video frame interval such that the noise content of the projected images is perceived to be attenuated by averaging over the same period. The method for generating each hologram as described in both patent applications is a single computationally intensive step for each hologram. The computationally intensive step is a Fourier transform.

A hologram is a recording of the relative phase and amplitude of a radiation field, typically monochromatic and within the visual spectrum, emanating from an illuminated scene or object. When monochrome light of uniform amplitude and coherent phase is incident upon a hologram, the hologram can condition the amplitude and relative phase of the incident light to reproduce an image, which has been previously recorded within the hologram.

An important characteristic of a displayed image is that it is perceived by an observer as a light intensity display. The phase variation of the radiation forming the image is not perceived by the observer. In the case of an image originating from a hologram, the relative phase and amplitude distribution within the hologram plane determines the variation in light intensity across the image. The phase of the light forming the image will vary across the image both in space and time, but the observer will be unaware of such variations.

A computer generated hologram is a hologram where the amplitude and phase within the hologram is determined, not by recording light patterns from a real object, but by computing directly the required amplitude and phase to reproduce a required image.

For certain optical arrangements, the relationship between an image and its hologram is such that the image is the Fourier transform of the hologram. Thus, it is possible to define a desired image, for example symbols for a display or a frame for a video sequence, and to compute the inverse Fourier transform of the desired image to determine a hologram. If the hologram is then prepared and introduced into an appropriate display system, the desired image will then be displayed for viewing by an observer.

A series of images, for example moving symbology or successive frames of a video sequence, could be used to generate a series of holograms. These can then be illuminated sequentially and a moving image would be displayed.

In practice, when a computer generated hologram has been calculated, it is not possible, using a dynamic display device to reproduce the required hologram properties exactly. Instead, an approximation to the required hologram is produced and the resulting image deviates from the required image. For example, it may be possible to produce only the required phase variations for the hologram, but the transmitted amplitude may be equal to the incident amplitude. A hologram which incorporates phase and no amplitude information is known as a kinoform.

The use of a kinoform rather than a hologram will introduce image artefacts. The perceived level of image artefact can be reduced by displaying a number of images in quick succession. Effectively, within each frame within a sequence of frames, a number of subframes are displayed. A human observer will not be able to separately distinguish the individual images within each subframe due to the finite response time of the human brain and eye. Instead, an observer will perceive the average intensity of the image during a frame period. If it can be arranged for the image artefact to vary randomly from one subframe to the next, then the perceived artefact will to some extent be averaged out by the eye and brain of an observer. One method for ensuring that the image artefact is random is to multiply the required image amplitude by a random phase pattern before the hologram is computed.

Thus a known method for displaying a video sequence using a dynamic device capable of forming kinoforms is as follows. The amplitude content of an image frame is determined. The amplitude is multiplied by a random phase pattern and an inverse Fourier transform is computed. The phase information is extracted from the computed transform to form a kinoform. This process is repeated for a given image frame to provide kinoforms for a subframe and the process is repeated for successive image frames to provide sets of kinoforms corresponding to successive frames. When the kinoforms are reproduced in an appropriate optical system, a video sequence of the image is displayed with a reduced level of artefact.

A feature of this method is that in order to display a given number of subframes within each frame, it is necessary to compute an inverse Fourier transform for each subframe within a given frame.

According to the first aspect of the present invention, a method for generating a desired image includes defining a target image, generating at least one source hologram from the target image, forming at least two intermediate holograms by applying at least one transformation to the source hologram wherein the transformation generates at least one intermediate hologram which is different to the other intermediate holograms associated with the source hologram, deriving at least two final holograms by applying at least one mathematical operation to combine for each final hologram at least two of the intermediate holograms associated with the source hologram and illuminating the at least two final holograms associated with a source hologram sequentially to provide a resultant image as a two dimensional variation of image intensity at an image plane.

Accordingly, the new method for generating an image now requires only a single inverse Fourier transform to be computed for each source hologram, typically one source hologram per frame, rather than, as in the prior art, an inverse Fourier transform for each subframe within a given frame.

In the method of the present invention, other sets of data are computed from one set of data comprising the transform. These other sets of data are formed by applying circular shifts to the original data set to form new intermediate data sets. Further data sets are formed by computing sums and differences of the intermediate data sets. These further datasets can be used directly to form subframe holograms. When kinoforms formed from these subframe holograms are displayed in a succession of frames in an appropriate optical system, a video sequence of images is displayed to an observer with a reduced level of artefact.

The method may include matching the mathematical operations used to generate at least two final holograms associated with the source hologram such that the final holograms are mutually compensating for reducing the level of artifact, or noise perceived by an observer. The final holograms are compensating in the sense that the corresponding images average to a multiple of the required image by design even though the individual images may substantially differ by design.

The method may include matching the mathematical operations used to generate a set of final holograms associated with the source hologram such that the intensities of the resultant images averages to a multiple of the required intensity of the target image.

The method may include selecting each mathematical operation from at least one of the following group: summation, difference, multiplication and division.

The method may include selecting each transformation from at least one of the following group: rotation, reflection and translation.

The method may include forming each intermediate hologram by applying a circular vertical or a circular horizontal shift or a combination of circular vertical and circular horizontal shift rotation to a source hologram.

The method may include forming each intermediate hologram by applying a circular vertical or a circular horizontal shift or a combination of circular vertical and circular horizontal shift rotation to said source hologram.

The method may include forming each intermediate hologram by applying different degrees of shift to said source hologram.

The method may include generating said source hologram by applying a phase modification to the image.

The method may include generating said source hologram by performing a an inverse Fourier transform on the phase modified image.

It will be understood that generation of a phase modified image can be completed by applying a predetermined phase pattern or random phase pattern to the required image amplitude.

The method may include generating video from a plurality of frames wherein each frame is comprised of the resultant images and may include forming at least one source hologram for each frame of the video.

Accordingly to another aspect of the invention an apparatus for displaying a desired image includes a substantially coherent light source, an addressable diffractive device, a hologram generator and an optical relay, the coherent light source being arranged to illuminate the diffractive device, the hologram generator being arranged to provide final holograms to the diffractive device and the optical relay being arranged to project the output of the diffractive device as a two dimensional variation of image intensity at an image plane, wherein the hologram generator includes a processor arranged to generate at least one source hologram corresponding to a desired image to be displayed, apply at least one transformation to the at least one source hologram to form at least two associated intermediate holograms, wherein the transformation generates at least one intermediate hologram which is different to the other intermediate hologram associated with the source hologram and generate at least two final holograms associated with the source hologram by applying at least one mathematical operation to combine for each final hologram at least two of the intermediate holograms associated with the source hologram.

The addressable diffractive device may be a spatial light modulator.

The new method and apparatus preferably provides for a single source hologram to be computed for each frame by a computationally intensive step to calculate an inverse Fourier transform to generate the source hologram and for the multiplicity of holograms within each frame to be derived by applying manipulations to the single source hologram. These manipulations comprise less intensive computational steps such as rotation, addition and/or subtraction than that required to compute an inverse Fourier transform. It will be understood that more than one source hologram can be computed for each frame, but this will increase the computation required for each frame.

An embodiment of the invention will now be described, by way of example only, with reference to the accompanying drawings, in which:

FIG. 1 is a schematic illustration of a hologram projector according to the prior art;

FIG. 2 is a block diagram for the method of generating an image using a holographic projector according to the prior art;

FIG. 3 is a schematic illustration of the generation of an image using a holographic projector according to the prior art;

FIG. 4 is a flow diagram of a method of producing an image according to an embodiment of the present invention;

FIG. 5 is a schematic illustration of the generation of an image according to an embodiment of the present invention;

Figure 6:
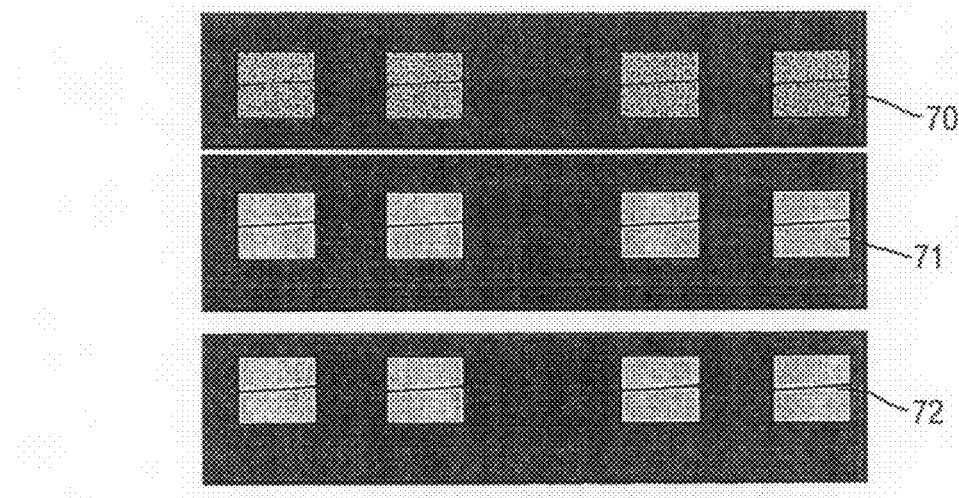
FIG. 6 is an output response of various images generated by prior art schemes and the present invention.

An efficient method has been devised for the production of a set of computer generated holograms such that the holograms are all different, but the displayed image intensity from the holograms averages to a specified image.

The method is of interest in applications where holograms are realised in an approximate form and are projected in rapid succession such that the approximation errors in the displayed image are perceived to be reduced by averaging over the set of holograms.

In the method of the invention, the set of holograms is derived from a single source hologram which is itself derived from a desired image. The source hologram has the property that, when it is projected, it gives the required image intensity pattern.

The phase distribution associated with the projected image intensity pattern can be random or arbitrary.

The set of holograms is formed in two stages. In the first step, intermediate holograms are formed by circular horizontal and circular vertical shifts of the source hologram. In the second step the final holograms are formed by summation and differencing of the intermediate holograms.

The method of the invention is applicable to optical arrangements where the content of the image field is a linear function of the hologram distribution and where the image intensity is substantially unchanged if the hologram is subject to a horizontal or a vertical circular shift or both. This would apply, for example, where the hologram is the inverse Fourier transform of the image field.

This method is of interest for real time generation of hologram images as it requires only one hologram, the source hologram, to be generated directly from the defined image for each frame of the image. The final holograms are derived by manipulation of the source hologram. This is more efficient than the prior art method where all the holograms for a given frame of the image are generated directly from different realisations of the image field, each with common image intensity, but different phase characteristics.

The method of the invention is based on the principal that the image amplitude and phase distribution is a linear function of the hologram values. When two holograms are added their corresponding image amplitudes and phases are added. It will be noted that the image intensity is equal to the square of the first image amplitude plus the square of the second image amplitude plus the cross product of the first and second image amplitudes.

When two source holograms are differenced their corresponding image amplitude and phases are differenced. It will be noted that the image intensity is equal to the square of the first image amplitude plus the square of the second image amplitude minus the cross product of the first and second image amplitudes. If the sums and differences of the two holograms are projected in quick succession then the cross product terms in the image perceived by an observer cancel because they are equal and opposite. The image intensities corresponding to the two original images reinforce each other. If the two holograms each correspond to the same source image then the net perceived intensity corresponds to a multiple of the required image intensity.

Two intermediate holograms, which are summed and differenced, can themselves be derived from a single source hologram. If the source hologram is vertically and horizontally shifted, the projected image intensity remains unchanged, but the phase content is modified. Two such intermediate holograms can be derived by applying different vertical and horizontal shifts to the source hologram. Each intermediate hologram will have the same projected image intensity, but differ in the phase distribution in the projected image plane.

The method can be extended by generating multiple pairs of intermediate holograms by the application of different circular shifts in the source hologram. Each set of intermediate pairs can be used to generate sum and difference final holograms, which are to be shown in succession. In an alternative embodiment a set of intermediate holograms is formed and the intermediate holograms combined using various combinations of summation and differencing such that the image intensity over the set of combinations average out to a multiple of the required image intensity. The latter approach has been found to give a more effective averaging process for applications where the holograms are subsequently realised in an approximate form.

Accordingly, the method can be summarised as:

(i) A required image is defined and the image amplitude is determined from the required intensity distribution and a phase distribution is associated with the image amplitude. The phase distribution is normally chosen so as to ensure that the information contained in the hologram is evenly spread across the dimensions of a generated source hologram;

(ii) The source hologram is computed from the defined image;

(iii) Intermediate holograms are formed by applying vertical and horizontal shifts to the source hologram wherein the degree of shift is different for each intermediate hologram;

(iv) A set of final holograms is derived by applying summation and differencing operations to the intermediate holograms; and (v) The set of final holograms is outputted from the processing.

The set of final holograms have the properties that they are formed using an efficient method of computation, each hologram is different, if the final holograms are for use in a practical real-time application, the final holograms are represented in an approximate form and the approximation errors for each final hologram will be different in each case. If the approximate representations of the hologram are projected in rapid succession, then the perceived image is close to the required image and approximation errors are attenuated by averaging.

A variant of the method can be used to generate additional holograms from more than one source hologram, where each of these source holograms correspond to the required image but with different phase characteristics.

In a case where holograms are restricted to binary values, the input image is normally confined to one half of the image plane only. In such a case, the inverse Fourier transform of two such images can be computed within a single complex fast inverse Fourier transform (IFFT) by appropriate packing of the data for the images. Thus, the required Fourier transform computation rate can be halved by using a single complex IFFT to compute the source holograms for two consecutive frames. Combining with the new method of computation, the effective requirement for the Fourier transform computation rate is reduced to one transform per two frame periods.

Suppose that two new holograms are generated from a source hologram by applying shifts rotation in the horizontal and vertical directions, the extent of the shift being different for the two holograms. Further suppose that the two holograms are added to form a summed intermediate hologram, the resultant image will be similar to that of the source hologram, but there will be an additional modulation component. Also, suppose that the two holograms are differenced to form a differenced intermediate hologram, the resultant image will be similar to that of the source hologram, but there will be an additional negative modulation component, which is substantially equal and opposite to that of the summed intermediate hologram. If the summed and differenced intermediate holograms are displayed in quick succession, then the modulation component will be cancelled in the image perceived by an observer and the image will appear identical to that originating from the source hologram. If the summed and differenced intermediate holograms are not projected, but instead approximations of those holograms are projected, then the images will include approximation noise. The approximation noise will be different in the two images as the intermediate holograms are different and the approximation noise will average out to a certain extent.

This method can be generalised to enable the generation of a number of final holograms for each frame wherein each hologram is derived as a combination of sums and/or differences of a number of intermediate holograms, each of which is obtained by shifts of the source hologram in the vertical and horizontal directions. With a suitable choice of combinations, it is possible to arrange for the resultant perceived image to be a close approximation of the image from the source hologram, but with the noise variance of each frame attenuated by visual averaging over the set of final holograms within a given frame.

Referring to FIG. 1, a known hologram projector 10 comprises a collimated monochrome coherent light source 11 arranged to illuminate a hologram source 12. Light from the light source 11, which passes through the hologram source 12, is focused by an optical system 13 to form an image in a replay field 14. Under certain optical arrangements a hologram produced by the hologram source 12 is the inverse Fourier transform of an image to be displayed in the replay field 14. Accordingly, to project a particular image, it would necessary to compute the two dimensional inverse Fourier transform of such an image and to generate a hologram at the hologram source 12 which embodies the amplitude and relative phase characteristics of the computed transform.

In order to project a dynamically changing image it is necessary to utilise a spatial light modulator (SLM) as the hologram source 12. Furthermore, a SLM, which can reconfigure at the required rate for video update, is not capable of representing the amplitude and relative phase of a holographic field exactly. Typically, only the phase can be represented and then only approximately. For example, an SLM formed from Ferroelectric liquid crystal of silicon (FLCOS) is a bistable device that can only represent uniform amplitudes notionally at 0 or 180° for each element of the FLCOS.

Consequently, an approximate hologram will give rise to a noisy image. One known method of attenuating the noise arising from an approximate hologram has been developed at Cambridge University and is described with reference to FIGS. 2 and 3.

Referring to FIG. 2, apparatus 20 for generating a display according to the prior art method is illustrated. Processor 21 determines the required amplitudes of a subframe of a given frame of an image and stores the information in a memory device 22. A phase modifier 23 receives the amplitude information from memory device 22 and multiplies it by a random phase pattern and passes the product function to an inverse FFT generator 24 which generates an inverse Fourier transform of the phase modified image of the subframe. The inverse Fourier transform is passed to a processor 25 arranged to compute an approximate hologram or kinoform based on the inverse Fourier transform. This approximated hologram is fed to a display device arranged to display the subframe on a display 26. It will be noted that once a first subframe for a frame of an image has been displayed the process returns via loop 27 to the phase modifier 23 which then generates the approximate hologram or kinoform associated with the subsequent subframe of that frame. This process is repeated for each subframe of a frame until the complete frame and hence the image associated with the frame has been displayed on the display 26.

Referring to FIG. 3, a target image 30 to be displayed has a set of subframe images 31 generated which have the required frame image amplitude but each with a different random phase characteristic. It should be noted that a human observer can only discern the intensity of an image and not the phase of an image.

An inverse Fourier transform is computed for each of the subframe images 31 to generate a set of corresponding holograms 32. These holograms are represented as a set of approximate holograms 33 for display on a display device sequentially as subframes 34a to 34d. Since there are different phase characteristics the approximation errors are different for each approximate hologram 33. Accordingly, if the different images are rapidly projected as subframes 34a to 34d within a frame period then a human observer 35 will tend to see the frame image with the noise averaged out.

It will be noted that the prior art process required N inverse Fourier transforms to be performed for N subframes. However, preferably only one inverse Fourier transform needs to be computed for each frame having N subframes in the present invention. It will understood that computation savings will be made over the prior art if an upper limit of N-1 inverse Fourier transforms are performed for N subframes.

Referring to FIG. 4, apparatus 40 according to the present invention includes a processor 41 arranged to determine the amplitude information for a frame of a desired image to be displayed. The amplitude information is passed to a phase modifier 42 arranged to apply a random, or some other appropriate phase pattern, to the desired image to create a resultant. The resultant is passed to an inverse FFT generator 43 which determines an inverse Fourier transform for the phase modified image and the result is stored in a memory device 44 as a source hologram. The source hologram is used by a processor 45 to perform circular shifts on the source hologram to create an intermediate hologram for a subframe which is stored in a buffer 46. This process is then repeated via loop 47 for each subframe within a given frame until the frame is complete. Each subframe once completed is moved from buffer 46 to an accumulation buffer 48 for further processing. Once the frame is complete, a processor 49 is used to compute final holograms from the accumulated intermediate holograms in buffer 48 using sum and difference calculations to produce the final holograms.

The resultant final holograms are passed to a display 50 for approximation and display to an observer, not shown. The process of computing final holograms is repeated for each subframe within a frame via loop 51 until the complete frame of the desired image has been displayed by the display 50. The process will then return to processor 41 to compute the next frame associated with the desired image.

Referring to FIG. 5, here a target image 60 is multiplied by an appropriate phase pattern to provide a phase modified image 61. An inverse Fourier transform is performed on the phase modified image 61 to provide a source hologram 62. From the source hologram 62 a set of intermediate holograms 63 are formed using shifts of the source hologram 62 about the vertical and/or horizontal axes.

The set of intermediate holograms 63 are used to form a set of final holograms 64 using sum and/or differencing of various members of the set of intermediate holograms 63.

The final holograms 64 are approximated to form kinoforms 65 which are displayed to an observer 66 using a suitable optical apparatus including a light source, not illustrated. The illuminated kinoforms 65 are displayed sequentially to the observer 66 as illuminated subframes 67a to 67d. Accordingly, the observer 66 perceives only one image formed from a number of subframes 67a to 67d corresponding to illuminated kinoforms 65, wherein the noise associated with the kinoforms 65 averages over time and the observer 66 does not perceive such noise.

Referring to FIG. 6, display image 70 represents that created using a single hologram to create the final image. The display image 70 includes four foreground image blocks against a darker background. A sloping dark line crosses each image block to give a further feature for image assessment. It will be noted that each foreground image block is very noisy and the sloping dark line is difficult to discern.

Display image 71 illustrates the image used in generation of display image 70, but created using the prior art algorithm described with reference to FIGS. 2 and 3 and using twenty-four holograms, each hologram being generated using an individual inverse Fourier transform. It will be noted that the display image 71 has much less noise when compared to the display image 70 and a sloping dark line across the display image 71 has a better contrast with respect to its associated image block.

Display image 72 illustrates the same image used in the generation of display image 70, wherein the display image 72 has been formed using twenty-four intermediate holograms of one source hologram according to the present invention. It will be noted that there is little, if any, discernable differences between the display image 71 and display image 72. However, it will also be noted that far less processing power is required to create twenty-four intermediate holograms from one source hologram rather than twenty-four holograms per image. It will also be understood that when generating video having a number of such images per second or per frame will require far greater processing power and saving such processing power for creating one frame of an image using the present invention will enable a video image to be created.

For example, the theoretical comparison of the prior art method and the present invention are as follows for a 512×512 pixel image achieving performance as illustrated in FIG. 6:

(i) according to the prior art method inclusive of phase modification requires 2×512×512×9 complex adds for each subframe plus 2×512×512×5 complex multiples;

(ii) whereas the method of the present invention requires a computation of a single source hologram per subframe which includes 2×512×512×9 complex adds plus 2×512×512×5 complex multiples and thereafter the computation is 512×512×(3 to 8) complex adds per subframe of a frame.

The exact number of complex adds is dependent upon whether a simple or a more complex scheme of addition and subtraction is implemented. Real adds can be implemented in preference to complex adds where the final hologram is to be approximated by real binary values.

The additions can be conveniently and efficiently implemented as vector addition operations.

The present invention is compatible with a wide range of potential hardware implementation schemes for the Fourier projector or generator.

Figure 7:
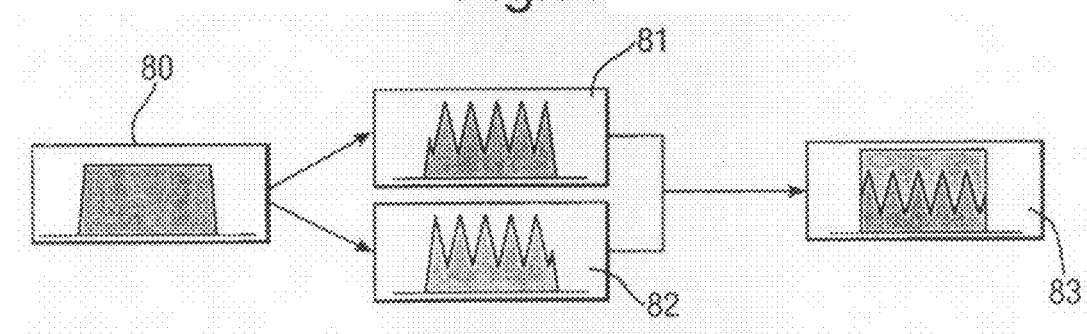
FIG. 7 is a schematic illustration of the generation of intermediate holograms and visual integration of such intermediate holograms, which shows the intensity distributions along a line taken through a corresponding two dimensional image.

Referring to FIG. 7, suppose a source hologram undergoes two different circular shifts to form two intermediate holograms, if the intermediate holograms are added then the projected image is equal to the source image plus a spatial modulation component. If the intermediate holograms are differenced, then the projected image is equal to the source image minus a spatial modulation component.

FIG. 7, shows the intensity profile 80 along a section through a source image which is used to generate a final hologram 81 (shown as an image intensity profile) by summation of two intermediate holograms, not shown, and final hologram 82 (shown as an image intensity profile) by differencing two intermediate holograms, not shown.

If the summation final hologram 81 and difference final hologram 82 are projected using a suitable illumination source in quick succession, then the spatial modulation term is cancelled and the source image is projected as shown in image 83 as an image intensity profile along the same section.

If the summation final hologram 81 and difference final hologram 82 are approximated prior to projection, then the approximation errors are different and they will tend to average out.

By using different circular shifts of the source hologram to create intermediate holograms, it is possible to produce numerous "projection pairs" from a single source hologram.

In practice, to achieve the necessary performance, it will be necessary to utilise combinations of sums and differences of intermediate holograms, i.e. the source hologram rotated, rather than simple sums and differences.

In a simple scheme:
A+B and A−B
where A and B are intermediate holograms.
In an alternative more complex scheme:
A+B+C+D, A+B−C−D, A−B+C−D and A−B−C+D
where A, B, C and D are intermediate holograms.

Accordingly, the present invention facilitates real time, low cost processing of holograms in order to achieve real time processing of images for display using a Fourier generator.

It will be understood that it is possible to provide more than one source hologram per frame for a desired image and to operate on each hologram in the manner described with reference to FIGS. 4 to 7 to provide final holograms for projection of the desired image at an image plane. However, the provision of more than one source hologram will increase the amount of computation and hence processor load as an inverse Fourier transform will need to be calculated for each source hologram.

In an alternative embodiment of the invention, not illustrated, a circular processing technique as illustrated with reference to FIG. 4 can be replaced with a system that stores two concatenated sets of data relating to a source hologram in a memory device 44 and reading out the sets of stored data, but beginning the read out of data at different start points for each set of data to produce an intermediate hologram. Each different start point can relate to a given intermediate hologram.

It will recognised that the generation of approximated final holograms, i.e. kinoforms, and display to an observer can also be implemented on a pixel by is pixel basis for all subframes within a given frame rather than generation of a complete subframe before creation of the next subframe for the given frame.

The invention claimed is:

1. A method for generating an image, including:
defining a target image;
generating at least one source hologram from the target image;
forming at least two intermediate holograms by applying at least one transformation to said at least one source hologram wherein the transformation generates at least one intermediate hologram which is different to the other intermediate holograms associated with said at least one source hologram;
deriving at least two final holograms by applying at least one mathematical operation to combine for each final hologram at least two of the intermediate holograms associated with said at least one source hologram; and
illuminating the at least two final holograms associated with said at least one source hologram sequentially to provide a resultant image as a two dimensional variation of image intensity at an image plane.

2. A method, as claimed in claim 1, including matching the mathematical operations used to generate at least two final holograms associated with said at least one source hologram such that the at least two final holograms are mutually compensating for reducing noise perceived by an observer.

3. A method, as claimed in either claim 1 or claim 2, including matching the mathematical operations used to generate a set of final holograms associated with said at least one source hologram such that the intensities of the resultant images average to a required intensity of the target image.

4. A method, as claimed in either claim 1 or claim 2, including selecting each mathematical operation from at least one of the following group: summation, difference, multiplication and division.

5. A method, as claimed in claim 1, including selecting each transformation from at least one of the following group: rotation, reflection and translation.

6. A method, as claimed in claim 5, including forming each intermediate hologram by applying a circular vertical or a circular horizontal shift or a combination of both circular vertical and circular horizontal shift to said at least one source hologram.

7. A method, as claimed in claim 5 or 6, including forming each intermediate hologram by applying different degrees of shift to said at least one source hologram.

8. A method, as claimed in claim 1, including generating said at least one source hologram by applying a phase modification to the target image.

9. A method, as claimed in claim 8, including generating said at least one source hologram by performing an inverse Fourier transform on the phase modified image.

10. A method, as claimed in claim 1, including generating video from a plurality of frames wherein each frame is comprised of said resultant image and including forming at least one source hologram for each frame of the video.

11. An apparatus for displaying a desired image, including:
a substantially coherent light source;
an addressable diffractive device;
a hologram generator; and
an optical relay;
the coherent light source being arranged to illuminate the diffractive device, the hologram generator being arranged to provide final holograms to the diffractive device and the optical relay being arranged to project the output of the diffractive device as a two dimensional variation of image intensity at an image plane;
wherein the hologram generator includes a processor arranged to:
generate at least one source hologram corresponding to a desired image to be displayed;
apply at least one transformation to said at least one source hologram to form at least two associated intermediate holograms, wherein the transformation generates at least one intermediate hologram which is different to the other intermediate hologram associated with said at least one source hologram; and
generate at least two final holograms associated with said at least one source hologram by applying at least one mathematical operation to combine, for each final hologram, at least two of the intermediate holograms associated with said at least one source hologram.

12. An apparatus, as claimed in claim 11, wherein the addressable diffractive device is a spatial light modulator.

* * * * *